United States Patent Office

3,664,845
Patented May 23, 1972

1

3,664,845
MOLECULAR FRACTIONATION BY PULSED CENTRIFUGATION
Herman H. Friedman, Bayside, N.Y., assignor to General Foods Corporation, White Plains, N.Y.
No Drawing. Filed Nov. 25, 1970, Ser. No. 92,909
Int. Cl. B01d 15/08
U.S. Cl. 99—57                        5 Claims

ABSTRACT OF THE DISCLOSURE

A means for the rapid, efficient fractionation of water soluble substances by means of passage through a molecular fractionating gel has been developed which employs a pulsed centrifugation technique. This development is a useful food processing operation to quickly and efficiently separate valuable food components such as flavors and proteins from aqueous solutions such as coffee extract and whey.

BACKGROUND OF THE INVENTION

There exist well-known methods for the physical separation of soluble materials having different molecular weights by passing aqueous solutions through beds of molecular fractionating gel. These methods may include the use of an uncharged granular gel molecular fractionating material which is capable of selectively sorbing substances from an aqueous solution in accordance with their molecular weights.

According to these techniques molecules greater in size than the exclusion limit of the gel are able to pass through the gel bed relatively unhindered, while those molecules smaller than the exclusion limit are hindered in their passage through the bed such that the smallest molecules will take the longest time to pass through the bed. Illustrative of this gel filtration technique are systems known in the art under the trade names Sephadex and Bio-gel.

One method which has heretofore been employed for utilizing these molecular fractionating gels, which method is fully explained in U.S. Pat. No. 3,002,823, the disclosure of which is herein incorporated by reference, involves applying the aqueous solution to be fractionated on a packed column of expanded molecular fractionating material. Thereafter an elution liquid, generally water or water containing buffering substances, is continually added to the column in order to carry the soluble substances into and through the packed column.

This technique is effective to separate the soluble substances according to their molecular weights; however, significant drawbacks exist in the fact that it takes a prolonged period of time for all of the soluble solids to pass through the column and in the fact that the effluent fractions obtained by this technique are very dilute solutions. If the soluble substances are desired in a concentrated or dry state, each of the effluent fractions must be subjected to a water removal step. The least expensive way in which to remove this water is by means of heat; however, prolonged or high temperature heating will degrade many heat sensitive substances such as flavors and proteins. Alternatively, water removal can be accomplished by means of a freeze drying operation; however, the cost of freeze drying becomes impractical for very dilute solutions.

2

It is, therefore, highly desirable to develop a technique for the quick, efficient molecular fractionation of soluble substances from aqueous solutions into fractions which are relatively concentrated.

SUMMARY OF THE INVENTION

Fractionation of soluble substances according to their molecular weights from aqueous solutions is accomplished by passing the solution through a bed of a molecular fractionating gel under the influence of a variable pressure force, such as centrifugal force, and then expanding and contracting the bed by means of pulsed centrifugation in order to speed the removal of the soluble solids which have been selectively entrapped within the gel bed.

It is an object of this invention to describe a gel filtration procedure which quickly and efficiently separates soluble solids according to their molecular size.

It is an object of this invention to provide a commercially feasible method for rapid molecular fractionation with a minimum dilution of the soluble solids.

These and other objects will become apparent from the description herein.

DESCRIPTION OF THE INVENTION

According to this invention it is possible to quickly and efficiently fractionate soluble solids from aqueous solutions according to their molecular weights.

Various commercially available solutions such as coffee extract and liquid whey contain valuable soluble solids at least some of which (e.g. flavor notes and proteins) are quite heat sensitive. This invention applies a pulsed centrifugation technique to gel filtration systems in order to provide a commercially feasible system for the fractionation of soluble solids, especially heat sensitive solids.

Gel filtration separates mixtures of water soluble substances into three broad fractions on the basis of (a) molecular exclusion, (b) relative rates of diffusion into and out of the gel matrix and (c) diffusion which is retarded by adsorptive forces acting between the gel matrix and the diffusing substances. It is hypothesized that a gel bed used in a centrifugal technique would speed up the separation of excluded substances and further that a pulsed force manner of operation would expand and contract the bed and thus permit the rapid recovery cf substances in the diffusible and adsorbed fractions. The pulsed centrifugal technique would be of practical value in food processing since important flavor components of a variety of food products such as coffee have been shown to be included in the diffusible and adsorbable fractions.

For the practice of this invention expanded beds of gel filtration media are prepared in a basket centrifuge by forming aqueous suspension of expanded granular gel material, pouring the suspension into the basket centrifuge and spinning the centrifuge to distribute the gel material and remove any excess water. The aqueous solution of substances to be separated is carefully passed into the basket centrifuge rotating at a low (about 50 to 750 G) centrifugal force and this effluent ($F_0$) is collected. When all the solution has been added and effluent no longer appears the centrifuge is increased to a high (at least 1000 G or more) centrifugal force and this effluent ($F_1$) is also collected. After this flow has ceased, the centrifugal force is then returned to a low value and a small amount (less than about 10% of the volume of the initial solution) of wash water is added to the basket. After a brief period at low speed, sufficient to distribute the wash water throughout the bed, but insufficient to force the wash water through the bed, the centrifugal force is again increased and the effluent ($F_2$) is collected. This washing procedure is repeated sequentially until the solids are completely removed. This normally requires about 5 to 8 washes.

The magnitude of the force employed to speed the solution through the gel bed will be determined by both the particular solutes to be fractionated and the particular gel material employed. It has been found that for fractionating solutions, such as coffee extract, which contain solutes having small differences in molecular weights, the G force employed during fractionation should be relatively high. Whereas for solutions such as whey which contain solutes having large differences in molecular weight, relatively low G forces can be employed.

As previously indicated the purpose of this pulsed centrifugation technique is to hasten the passage of the occluded solids through the gel bed by expanding and contracting the bed under the influence of variable centrifugal force. The use of the method of this invention is capable of yielding a reduction of operating time to about one-tenth of that necessary according to the procedure of Pat. No. 3,002,823. Additionally the total volume of effluent obtained according to the method of this invention will be several times less than the effluent according to Pat. No. 3,002,823. In operation the total amount of effluent produced from initial addition of the solution until complete regeneration of the bed will, according to the pulsed centrifugation technique of this invention, seldom amount to more than two or three times volume of the initial solution; whereas the total effluent according to Pat. No. 3,002,823 will normally amount to about 10 to 30 or more times the volume of the initial solution.

The relatively high solids content of the effluent fractions of this invention makes it far easier to obtain dry solid material, and the decreased amount of water which must be removed even makes such expensive drying techniques as freeze drying practical. This is especially useful when the solids are heat sensitive and drying with heat would have to be avoided.

The degree of fractionation of the soluble solids into their various molecular weight fractions has not been found to be significantly different between the pulsed centrifugation technique of this invention and those methods heretofore practiced in the art.

This invention is further described by, but not limited to the following examples:

EXAMPLE 1

980 ml. of commercial coffee extract containing 20% dissolved solids, obtained from a standard percolation process, were slowly passed into an 11" diameter basket centrifuge rotating at 700 G force and containing a bed formed from 400 grams of Sephadex G-25. When all of the extract had been added and centrifugate no longer appeared, the speed was turned up to about 1550 G and centrifugate collected at the higher speed. After flow had ceased, 150 ml. of water were added at the same rate as above after first reducing the speed of the centrifuge to the 700 G level. When all of the wash water was added, the speed was again increased to 1550 G and centrifugate collected. The pulsing technique first at low speed followed by high speed removal, is repeated until solids are completely removed. This requires about 7 washes of equal volumes. The major flavor solid fractions are extracted in the first 150 ml. wash with some small carry over into the second wash. The first two centrifugates concentrate the high molecular weight material present in percolate extract. The remaining fractions contain the low molecular weight material irrespective of the major flavor fraction.

EXAMPLE 2

14.31 pounds of commercial percolation coffee extract were added slowly to an 11" diameter stainless steel basket containing a uniform bed of Sephadex G-10 Fine Beads (1000 grams) in a fitted Nylon Centrifuge Bag and rotating at 700 G force. The centrifugate collected at this speed is called Fraction #1. The speed is then increased to 1550 G force and Fraction #2 collected. Subsequently, the bed is washed with aliquots of water by the pulsed method, i.e., 75 ml. of water added at 700 G force followed by an increase to 1550 G force to squeeze out Fraction #3A. This is followed by the addition of an additional 75 ml. to give Fraction #3B and finally by addition of 150 ml. of water to obtain Fraction #4. An additional three to six wash fractions are collected by the procedure used to obtain Fraction #4 in order to prepare the Sephadex bed for a fresh sample of coffee extract.

The desirable aromatic flavor fractions were located by subjective taste analysis and found to be concentrated in Fractions 3B, 4 and 5. These were combined and freeze dried in a Stokes freeze dryer. The remaining non-flavored fractions were recombined and spray dried in a semi-commercial scale type N spray drier. The yield of freeze dried flavor fractions was 232 grams, equivalent to a solids yield of 3.5% of the total extract processed in the centrifugal Sephadex procedure. Spray dried powder was prepared from a sample of the original percolate as a control.

Taste test results by expert tasters indicated the addition of the freeze dried flavor fraction produced a significant improvement in beverage character in the direction of brewed coffee flavor characterized by more heavy notes, body and acidity. The process may be modified to include the addition of any specific natural or synthetic flavor compounds to the flavor fraction before freeze drying.

EXAMPLE 3

Ten liters of coffee extract prepared by a commercial percolation process from Robusta coffee beans was processed by the pulsed centrifugal Sephadex method described in Example 2. Subjective evaluation indicated the harsh, tarry flavor attributed to Robusta coffee occurred in the low solids wash Fractions #5 through #7. These fractions are set aside and Fractions #1 through #4 recombined and freeze dried. A sample of the original percolate is freeze dried as a control. Subjective evaluation by an expert taste panel confirmed the successful removal of the harsh, tarry flavor by the centrifugal fractionation method. The loss of solids incurred by this elimination was less than 10%.

It will be apparent that there are variations and modifications of this invention and that the examples, preferred ingredients and apparatus, and typical operating conditions may be varied without departing from the scope of the invention.

Having thus described the invention what is claimed is:

1. A pulsed pressure method of molecular fractionation of soluble solids by means of gel filtration systems comprising the steps of:
    (a) applying a quantity of aqueous solution of soluble solids to an expanded gel filtration bed, under the influence of a low pressure force of about 50 to 750 G,
    (b) maintaining said low pressure force until effluent no longer appears,
    (c) increasing the pressure force to at least 1000 G or more and collecting the effluent,
    (d) maintaining the increased force until effluent no longer appears,
    (e) decreasing the pressure force to about 50 to 750 G,
    (f) adding a quantity of elution liquid to the bed, (g) increasing the pressure force to at least 1000 G or more and collecting the effluent, and (h) repeating steps (e) through (g) a plurality of times.

2. The method according to claim 1 wherein the pressure force is obtained by centrifugal force.

3. The method according to claim 2 wherein the elution liquid is less than about 10% the volume of the aqueous solution.

4. The method of claim 3 wherein the aqueous liquid is liquid coffee extract.

5. The method of claim 3 wherein the aqueous liquid is liquid whey.

References Cited

UNITED STATES PATENTS

| | | | |
|---|---|---|---|
| 3,002,823 | 10/1961 | Flodin et al. | 210—31 C |
| 3,229,505 | 1/1966 | Sanford et al. | 210—31 C |
| 3,583,230 | 6/1971 | Patterson | 210—78 X |

SAMIH N. ZAHARNA, Primary Examiner

U.S. Cl. X.R.

99—57; 210—31 C, 78, 198 C